United States Patent
Quintanilla et al.

(10) Patent No.: US 10,435,632 B2
(45) Date of Patent: Oct. 8, 2019

(54) REMOVAL OF IRON CONTAMINANTS FROM HYDROCARBON OILS AND AQUEOUS BY-PRODUCTS OF OIL AND GAS RECOVERY/PRODUCTION

(71) Applicant: Temple University—Of The Commonwealth System of Higher Education, Philadelphia, PA (US)

(72) Inventors: Bert Quintanilla, Corpus Christi, TX (US); Daniel R. Strongin, Wynnewood, PA (US)

(73) Assignee: Temple University—Of The Commonwealth System of Higher Education, Philadelphia, PA (US)

(*) Notice: Subject to any disclaimer, the term of this patent is extended or adjusted under 35 U.S.C. 154(b) by 215 days.

(21) Appl. No.: 15/511,477

(22) PCT Filed: Sep. 10, 2015

(86) PCT No.: PCT/US2015/049311
§ 371 (c)(1),
(2) Date: Mar. 15, 2017

(87) PCT Pub. No.: WO2016/044046
PCT Pub. Date: Mar. 24, 2016

(65) Prior Publication Data
US 2017/0253814 A1    Sep. 7, 2017

Related U.S. Application Data

(60) Provisional application No. 62/050,931, filed on Sep. 16, 2014.

(51) Int. Cl.
| | | |
|---|---|---|
| C10G 29/20 | (2006.01) |
| C09K 8/52 | (2006.01) |
| C02F 1/54 | (2006.01) |
| E21B 21/06 | (2006.01) |
| C02F 1/68 | (2006.01) |
| C02F 1/00 | (2006.01) |
| C02F 101/20 | (2006.01) |
| C02F 103/10 | (2006.01) |
| C02F 103/36 | (2006.01) |

(52) U.S. Cl.
CPC .............. *C10G 29/20* (2013.01); *C02F 1/547* (2013.01); *C02F 1/683* (2013.01); *C09K 8/52* (2013.01); *E21B 21/068* (2013.01); *C02F 2001/007* (2013.01); *C02F 2101/203* (2013.01); *C02F 2103/10* (2013.01); *C02F 2103/365* (2013.01); *C02F 2305/04* (2013.01); *C09K 2208/32* (2013.01); *C10G 2300/205* (2013.01)

(58) Field of Classification Search
CPC ... C10G 29/20; C10G 2300/205; C02F 1/683; C02F 1/547; C02F 2103/365; C02F 2103/10; C02F 2101/203; C02F 2001/007; C02F 2305/04; E21B 21/068; C09K 8/52; C09K 2208/32
See application file for complete search history.

(56) References Cited

U.S. PATENT DOCUMENTS

| | | | |
|---|---|---|---|
| 2,761,821 | A | 9/1956 | Jahnig |
| 3,436,339 | A | 4/1969 | Rudy et al. |
| 3,459,658 | A | 8/1969 | Langlois et al. |
| 3,582,489 | A | 6/1971 | Meadow et al. |
| 5,080,779 | A | 1/1992 | Awbrey et al. |
| 5,271,863 | A | 12/1993 | Roling |
| 5,660,717 | A | 8/1997 | Lindemuth |
| 7,153,541 | B2 | 12/2006 | Elsetinow et al. |
| 2005/0036930 | A1* | 2/2005 | Elsetinow ............... B09C 1/08 423/269 |
| 2012/0021130 | A1 | 1/2012 | Strongin et al. |
| 2014/0162909 | A1* | 6/2014 | Ballard .................... C09K 8/03 507/116 |

FOREIGN PATENT DOCUMENTS

| | | |
|---|---|---|
| CN | 1431277 A | 7/2003 |
| CN | 1208434 C | 6/2005 |
| CN | 100547716 C | 10/2009 |

OTHER PUBLICATIONS

International Preliminary Report on Patentability for PCT/US2015/049311 dated Mar. 21, 2017.
International Search Report and Written Opinion for PCT/US2015/049311, dated Dec. 11, 2015.
Debnath et al., "Reductive dissolution of ferrihydrite by ascorbic acid and the inhibiting effect", Journal of Colloid and Interface Science, 341 (2010) 215-233.
Aldridge, et al., "Oil-and-gas industry may have new tool to treat frac water", San Antonio Business Journal (Sep. 8, 2014) 2 pgs.
Blue Ribbon Technology, (2013), www.brt-chem.com, accessed Oct. 19, 2014, 14 pgs.

\* cited by examiner

*Primary Examiner* — Randy Boyer
*Assistant Examiner* — Juan C Valencia
(74) *Attorney, Agent, or Firm* — Drinker Biddle & Reath LLP

(57) ABSTRACT

Iron contaminants are removed from hydrocarbon oils, and from produced water or flowback water by-products of oil and gas production, by treatment of such liquids with a composition comprising a two-tail lipid compound. The lipid binds iron to form a lipid/iron phase in the liquid, which is then removed to provide a liquid with a reduced iron level.

28 Claims, No Drawings

REMOVAL OF IRON CONTAMINANTS FROM HYDROCARBON OILS AND AQUEOUS BY-PRODUCTS OF OIL AND GAS RECOVERY/PRODUCTION

CROSS-REFERENCE TO RELATED APPLICATION

This application is a National Stage Application under 35 U.S.C. 371 of International Application No. PCT/US2015/049311, filed Sep. 10, 2015, and claims the benefit of the filing date of U.S. Provisional Patent Application No. 62/050,931, filed Sep. 16, 2014 is hereby claimed. The entire disclosure of the aforesaid application is incorporated herein by reference.

FIELD OF THE INVENTION

The invention relates to removal of iron contaminants from liquid hydrocarbons such as crude oil, and from aqueous by-products of oil and gas production.

BACKGROUND OF THE INVENTION

Hydrocarbon oils, such as crude oil and its distillation and conversion products, contain various contaminants that adversely impact refining processes. Crude oils and distillate oils may contain elemental metal or metal oxides and sulfides, particularly in the form of particulates which may originate in the crude oil itself or result from erosion or corrosion of metal piping or storage vessels. These metals may be harmful to downstream processes, such as catalytic cracking, and may poisoning cracking catalysts.

When deposited on cracking catalysts, metals can cause production of excessive amounts of coke and gas at the expense of desired fractions, such as gasoline and heating oil. Iron is a particularly detrimental contaminant, not only in catalytic cracking, but also in other catalytic processes such as hydrocracking.

It is desired to reduce the level of iron contamination in hydrocarbon feedstocks such as crude oils and distillate oils.

U.S. Pat. No. 3,463,339 discloses removal of soluble iron contaminants from hydrocarbon oils by treatment with aqueous sulfuric acid, followed by separating the iron-free oil from the aqueous acid phase to which the iron has been transferred.

U.S. Pat. No. 3,459,658 discloses removal of iron contaminants from hydrocarbon oils by contacting iron-contaminated oil with an aqueous medium containing an acid and a reducing agent capable of reducing iron from the ferric to the ferrous state.

U.S. Pat. No. 5,271,863 discloses removal of soluble iron contaminants from hydrocarbon oils by contact with a Mannich reaction product, which forms a complex with the iron species.

Related to iron contamination of hydrocarbon oils, aqueous liquids that may be used or generated in oil and gas drilling and recovery can contain substantial amounts of iron of geologic origin.

Flowback water is a water-based solution that flows back to the surface during and after the completion of hydraulic fracturing or "hydrofracking". It consists of the fluid used to fracture the shale. The flowback consists of 20 to 40% of the volume of hydrofracturing fluid that was initially injected into the well. The remainder of the fluid remains confined in the shale formation. The hydrofracturing fluid, through its injection and return to the surface in the form of flowback water, travels through geologic formations and when recovered may contain a variety of formation materials, including salt, heavy metals and other pollutants, making it unsuitable for disposal in freshwater lakes, rivers and aquifers. In particular, flowback water may contain significant amounts of iron.

Produced water, also known as brine or "oilfield brine", is naturally occurring water that is co-produced with the extraction of oil or gas from underground reservoirs. As reservoirs mature, the quantity of produced water climbs and often exceeds the volume of the hydrocarbons before the reservoir is exhausted. During gas extraction by hydrofracking, produced water is found in shale formations that flows to the surface throughout the lifespan of the gas well. At some point, the water that is recovered from a gas well makes a transition from flowback water to produced water.

Produced water, like flowback water, can contain significant amounts of iron from geological sources. What is needed is a method to reduce the concentration of iron contamination in flowback water and produced water, as well as in hydrocarbon oils.

SUMMARY OF THE INVENTION

Provided is a method for reducing the level of iron in a source liquid comprising hydrocarbon oil, produced water or flowback water, the method comprising: (i) adding into the source liquid a lipid composition comprising a two-tail lipid compound, said two-tail lipid compound comprising a hydrophilic head group attached to two of the same or different hydrophobic tails, in an amount effective to cause a separation of said source liquid into a first phase comprising the source liquid depleted in iron and a second phase comprising lipid and iron bound to the lipid; and (ii) recovering the first phase comprising the source liquid depleted in iron.

In some embodiments, the source liquid comprises a hydrocarbon oil. In some embodiments, the hydrocarbon oil is crude oil. In other embodiments the source liquid comprises produced water. In some embodiments the liquid comprises flowback water.

In some embodiments, the iron contained in the source liquid is in the form of particles, and the second phase comprises lipid-bound iron particles. In some embodiments, the particles comprise particles of iron oxide or iron sulfide.

In some embodiments, the iron contained in the source liquid is in the form of dissolved iron, and the second phase comprises lipid-iron complexes.

In some embodiments, the lipid composition comprises lipid dispersed in an aqueous medium.

In some embodiments, the two hydrophobic tails of the lipid compound are attached to the hydrophilic head group of the lipid compound by an ether or ester bond.

In some embodiments, the two hydrophobic tails of the lipid compound comprise hydrocarbon chains having from about 10 to about 24 carbon atoms.

In some embodiments, lipid compound is selected from the group consisting of phospholipids, sphingolipids, glycolipids and combinations thereof. In some embodiments, the lipid compound comprises one or more of the following phospholipids: phosphatidylcholine, phosphatidylethanolamine, phosphatidic acid, phosphatidylinositol, and sphingomyelin.

Also provided is a composition of a hydrocarbon oil comprising a first phase comprising said hydrocarbon oil, and a second phase comprising iron bound to a two-tail lipid compound comprising a hydrophilic head group attached to two of the same or different hydrophobic tails. Also provided is a composition of produced water or flowback water comprising a first phase comprising said produced water or flowback water, and a second phase comprising iron bound to a two-tail lipid compound comprising a hydrophilic head group attached to two of the same or different hydrophobic tails.

In some embodiments of the aforementioned composition of hydrocarbon oil, the hydrocarbon oil is crude oil.

In some embodiments of the aforementioned composition of hydrocarbon oil and the aforementioned composition of produced water or flowback water, the iron in the compositions is in the form of iron particles. In some embodiments, the iron particles comprise particles of iron oxide or iron sulfide. In some embodiments, the iron is present in the form of dissolved iron, and the second phase comprises lipid-iron complexes.

In some embodiments of the aforementioned composition of hydrocarbon oil and the aforementioned composition of produced water or flowback water, the two hydrophobic tails of the lipid compound are attached to the hydrophilic head group of the lipid compound by an ether or ester bond.

In some embodiments of the aforementioned composition of hydrocarbon oil and the aforementioned composition of produced water or flowback water, the two hydrophobic tails of the lipid compound comprise hydrocarbon chains having from about 10 to about 24 carbon atoms.

In some embodiments of the aforementioned composition of hydrocarbon oil and the aforementioned composition of produced water or flowback water, the lipid compound is selected from the group consisting of phospholipids, sphingolipids, glycolipids and combinations thereof. In some embodiments, the lipid compound comprises one or more of the following phospholipids: phosphatidylcholine, phosphatidylethanolamine, phosphatidic acid, phosphatidylinositol, and sphingomyelin.

Definitions

Unless defined otherwise, all technical and scientific terms used herein generally have the same meaning as commonly understood by one of ordinary skill in the art to which this invention belongs. Generally, the nomenclature used herein and the laboratory procedures in chemistry, analytical chemistry, lipid chemistry, geochemistry and mineralogy are those well-known and commonly employed in the art.

The articles "a" and "an" are used herein to refer to one or to more than one (i.e. to at least one) of the grammatical object of the article. By way of example, "an element" means one element or more than one element.

The term "about" will be understood by persons of ordinary skill in the art and will vary to some extent on the context in which it is used.

The term "flowback water" means the water-based solution that flows back to the outer surface of the Earth after the completion of a hydraulic fracturing procedure, and principally comprises the aqueous fluid injected into the earth to obtain hydraulic fracturing of a shale deposit.

The term "hydrocarbon oil" is meant to refer to a fluid comprising hydrocarbon compounds or a mixture of hydrocarbon compounds, represented by but not limited to, crude oil, and crude oil fractions.

As used herein, the term "hydrophilic head group" of a lipid refers to a water-soluble (hydrophilic) portion of a lipid capable of interacting with polar species, such as water or ionic compounds. Examples of hydrophilic head groups include, but are not limited to, phosphate [—OP(=O)(O$^-$)$_2$ as a terminal group, or —OP(=O)(O$^-$)O— as a connecting group], phosphoryl [—OP(O$^-$)$_2$], sulfate [—OS(=O)$_2$(O$^-$)], amino (—NH$_2$ or —NH$_3{}^+$), amines (primary, secondary, tertiary or quaternary), carboxylate (—C(=O)O$^-$), hydroxyl (—OH), thiol (—SH), carbonyl, or acyl functional groups, and the like and combinations thereof.

As used herein, the term "hydrophobic tail" refers to a carbon-containing portion of a lipid molecule. The hydrophobic tail may be aliphatic or aromatic, or a combination thereof. The hydrophobic tail of the lipid may be saturated or unsaturated. A hydrophilic head group may be attached to two hydrophobic tails, which may be identical or different from each other. The expression "attached to", as used herein with reference to the hydrophilic head group having two of the same or different hydrophobic tails attached to it, shall be understood to mean that the hydrophobic tails can be directly bonded to the hydrophilic head group or can be indirectly bonded to the hydrophilic head group, whereby, for example, each of the hydrophobic tails is bonded directly to the same linking group or different linking groups such as, for example, an ether or ester group, and the linking group is bonded to the hydrophilic head group. The hydrophobic tail may comprise a "fatty acid moiety", where a naturally occurring or synthetic fatty acid is incorporated in the hydrophobic tail by means of a chemical linkage, such as, but not limited to, an ester or an ether linkage.

As used herein, the term "lipid" refers to a fat-soluble (lipophilic) molecule, such as fats, oils, waxes, cholesterol, sterols, fat-soluble vitamins (such as vitamins A, D, E and K), monoglycerides, diglycerides, phospholipids, and others. As used herein, a "fatty acid" is a carboxylic acid that has four or more carbon atoms and is either saturated or unsaturated.

By "phase depleted in iron" with respect to a liquid treated with a lipid composition as described herein means a phase of the treated liquid in which the iron concentration is less than the concentration present in the liquid before treatment. By "phase enriched in iron" with respect to a liquid treated with a lipid composition as described herein means a phase of the treated liquid in which the iron concentration is more than the concentration present in the liquid before treatment.

As used herein, the term "produced water" refers to naturally occurring water that is co-produced with extraction of oil or gas from underground reservoirs. "Produced water" is also known as "oilfield brine".

As used herein, "source liquid" means the liquid under treatment to remove iron contamination. The source liquid comprises hydrocarbon oil, produced water, or flowback water.

As used herein, the term "two-tail lipid" refers to a lipid comprising a hydrophilic head group attached to two of the same or different hydrophobic tails.

As envisioned in the present invention with respect to the disclosed compositions of matter and methods, in one aspect the embodiments of the invention comprise the components and/or steps disclosed therein. In another aspect, the embodiments of the invention consist essentially of the components and/or steps disclosed therein. In yet another aspect, the embodiments of the invention consist of the components and/or steps disclosed therein.

DETAILED DESCRIPTION OF THE INVENTION

According to the invention, hydrocarbon oil, such as crude oil, containing iron contamination, or aqueous liquid byproducts of oil/gas production that may also contain iron contamination from, e.g., geological sources, are treated to remove iron. The process relies on the iron-binding effect of two-tail lipids, which bind iron to form a second phase (lipid/iron phase) in the source liquid under treatment. The lipid/iron phase is then separated from the source liquid by physical means relying on the higher density of the lipid/iron in comparison to the source liquid. Separation can be obtained by any means known to those skilled in the art for recovering a medium from an in situ formed second phase. Such methods include, for example, filtration, decantation, skimming, centrifugation and the like. The recovered source liquid is substantially reduced in iron content in comparison to the source liquid before treatment.

The hydrocarbon oil treated may comprise any hydrocarbon liquid subject to contamination by iron. The iron contamination may comprise iron metal, dissolved iron or compounds of iron such as iron oxides, and iron sulfides such as pyrite ($FeS_2$). A particular application of the process is in removing iron contaminants from a crude oil used as a catalytic cracking feed. Although the invention is generally described for use with petroleum crude oils, the present process is applicable to the extraction of iron from other liquid hydrocarbon. In particular, the invention has utility in reducing the iron content of other liquid hydrocarbon feedstocks of catalytic cracking processes. The liquid hydrocarbon feedstock may comprise, for example, a mineral oil and its various distillates, such as crude oil, atmospheric residue, vacuum residue, de-asphalted oil, shale oil, lubricating oil, or diesel oil.

The iron contamination may take the form of iron particles, or particles of an iron compound, such as an iron oxide or iron sulfide. The method of the present invention is effective is removing such iron particulates.

According to the present invention, the source liquid comprising hydrocarbon oil, produced water or flowback water is contacted with an effective amount of a composition comprising a two-tail lipid. The lipid composition may comprise two-tail lipid in solid, e.g., powdered, or liquid form. The lipid composition preferably contains, in addition to one or more two-tail lipid compounds, a carrier to form a liquid composition, to induce phase separation in the treated source liquid, and formation of a lipid phase comprising bound iron. The lipid composition is prepared by first dispersing, suspending, or dissolving the lipid into a carrier liquid, preferably an aqueous liquid. The aqueous liquid may comprise, for example, water, an aqueous solution of dilute acid, an aqueous solution of dilute base or an aqueous solution of salt, or a combination thereof, to form a lipid composition for treating the hydrocarbon liquid. Some or all of the lipids may be suspended, dispersed, or dissolved into an aqueous solution containing a percentage of organic solvent, as long as the content of organic solvent does not interfere with the iron-binding ability of the lipid. Suspension, dispersion or dissolution of the lipid in a liquid may be achieved by mechanical agitation, mechanical stirring or sonication, or any other method that does not cause significant degradation of the lipid.

Preferably, the concentration of lipid in the lipid composition ranges from about 0.5 millimolar (mM) to about 50 mM, more preferably from about 10 mM to about 50 mM, most preferably from about 10 mM to about 20 mM. Other concentrations may be contemplated, depending on the intended use and the level of iron contamination in the liquid to be decontaminated.

Preparation of lipid compositions that may be used in the practice of the present invention are described in U.S. Pat. No. 7,153,541 and US Pat. Pub. 2012/0021130, the entire disclosures of which are incorporated herein by reference. The aforesaid patent and publication describe methods of inhibiting oxidation of metal-sulfide containing materials.

The lipid composition is added to an iron-contaminated source liquid comprising hydrocarbon oil, produced water or flowback water in an amount sufficient to obtain binding of the iron contaminants and reduction of the level of iron contamination in the source liquid. The amount of lipid composition added, based upon the weight of solid lipid (with a molecular weight of 700 to 800 g/mol), may range from about 0.05 to about 2.5 grams, more preferably form about 1.5 to about 2.5 grams, and most preferably form about 2.0 to about 2.5 grams, per liter of hydrocarbon liquid. For treatment of produced water or flowback water, amount of lipid composition added, based upon the weight of solid lipid (with a molecular weight of 700 to 800 g/mol), may range from about 0.05 to about 8.0 grams, more preferably form about 5.0 to about 8.0 grams, and most preferably form about 7.0 to about 8.0 grams, per liter of flowback water.

The lipid composition may be mixed with the source liquid by stirring, agitation, or other means to obtain an even distribution of the lipid composition in the liquid. Typically, phase separation should take no more than 1 hour, but visual inspection of the treated material will allow the confirmation of phase separation.

Upon adequate mixing of lipid composition and source liquid, a second phase will develop in the source liquid. The second phase comprises lipid-bound iron. The second phase is enriched in iron, that is, the iron concentration is greater than the concentration present in the source liquid before treatment. A first phase comprising the source liquid is thus commensurately depleted in iron content, the iron having been absorbed by and partitioned to the lipid (second) phase.

The first phase, comprising the source liquid now depleted in iron contamination, is then recovered from the mixture comprising the first and second phases. By "recovering the first phase" material refers to any process which results in isolation of all or a substantial portion the first phase apart from the second phase. Preferably, substantially all of the second phase is separated from and removed from the iron-depleted source liquid. The second phase comprising lipid and bound iron may thus be removed from the source liquid by physical means relying on the higher density of the iron-enriched lipid-bound layer in comparison to the source liquid. Separation can be obtained by any means known to those skilled in the art for recovering a medium from an in situ formed separated second phase. Separation of the lipid/iron second phase form the source liquid first phase includes not only separation means that result in physical removal of the former from the latter, e.g., precipitation, settling, centrifugation, filtering, and the like, but also includes removal of the source liquid from the lipid/iron second phase, such as by skimming or decanting the source liquid. The recovered source liquid is substantially reduced in iron content. The level of iron concentration is preferably reduced in this manner by at least 20%, more preferably by at least 40, 50, 60 or 70%, and most preferably by at least 80%.

For removal of iron from flowback water or produced water, lipid in solid or liquid form may be added directly to the source water under treatment. Alternatively, the lipid may be first dispersed, suspended, or dissolved into water as described above, and thus supplied to the flowback or produced water as a solution, suspension or dispersion of lipid in an aqueous solution. The aqueous liquid may comprise, for example, water, an aqueous solution of dilute acid, an aqueous solution of dilute base or an aqueous solution of salt, or a combination thereof, to form a lipid composition for treating the flowback water or produced water. Some or all of the lipids may be suspended, dispersed, or dissolved into an aqueous solution containing a percentage of organic solvent, as long as the content of organic solvent does not interfere with the iron-binding ability of the lipid. Suspension, dispersion or dissolution of the lipid in the aqueous liquid may be achieved by mechanical agitation, mechanical stirring or sonication, or any other method that does not cause significant degradation of the lipid.

In one embodiment for removal of iron from a hydrocarbon oil, a lipid composition for treating the hydrocarbon oil is prepared using produced water as the aqueous liquid for preparing an aqueous lipid composition. In such cases, the lipid composition should contain a high enough concentration of lipid to remove iron that may contaminate both the produced water utilized in preparing the lipid composition, and the iron contamination in the hydrocarbon liquid under treatment.

The lipid compounds useful herein include any lipid compound having at least a hydrophilic head group and two of the same or different organic hydrophobic groups attached to the hydrophilic head group. Representative of these types of lipids are illustrated in Voet & Voet, 1995, *Biochemistry*, Chapter 11—Lipids and Membranes, pp. 277-290 (John Wiley & Sons, NYC, N.Y.), the contents of which are incorporated by reference herein. Such lipids can either form bilayers spontaneously in water, as exemplified by the phospholipids, or are stably incorporated into lipid bilayers, with its hydrophobic moiety in contact with the interior hydrophobic region of the bilayer membrane, and its head group moiety oriented toward the exterior.

Generally, the hydrophilic head groups of the two-tail lipid include, but are not limited to, phosphate, phosphoryl, sulfate, amino, amines, carboxylate, hydroxyl, thiol, carbonyl or acyl functional groups, and the like and combinations thereof.

Lipids that may be part of the lipid composition include the phospholipids, e.g., phosphatidylcholine, phosphatidylethanolamine, phosphatidic acid, phosphatidylinositol, and sphingomyelin, where the two hydrocarbon chains are typically between about 10-24 carbon atoms in length, and have varying degrees of saturation. The above-described lipids and phospholipids which chains have varying degrees of saturation can be obtained commercially or prepared according to published methods. Other suitable lipids include sphingolipids and glycolipids. Preferred lipids for use herein include, but are not limited to, diacyl glycerol, phosphatidyl ethanolamine (PE), diacylaminopropanediols, such as disteroylaminopropanediol (DS), phosphatidylglycerol (PG) and distearyl phosphatidylcholine (DSPC), egg sphingomyelin, 1,2-dipalmitoyl-sn-glycero-3-[phospho-L-serine] (16:0 PS), 1,2-dimyristoyl-sn-glycero-3-[phospho-rac-(1-glycerol)] (16:0 DGS), 1,2-bis(10,12-tricosadiynoyl)-sn-glycero-3-phosphocholine (23:2 diyne PC), 1,2-di-O-octadecyl-sn-glycero-3-phosphocholine (18:0 diether PC) and the like.

The hydrophobic tails can be the same or different and are hydrocarbon chains. Suitable hydrocarbon chains include those that are saturated or those having varying degrees of unsaturation and include, for example, an alkyl, an alicyclic or an alkylalicyclic group having from about 10 to about 24 carbon atoms or an alkylaryl where the alkyl group is from about 10 to about 24 carbon atoms, including, by way of illustration, unsubstituted straight or branched aliphatic, cycloaliphatic and aromatic groups and cycloaliphatic and aromatic groups substituted with one or more straight or branched aliphatic, cycloaliphatic and/or aromatic groups.

Lipids for use in forming the lipid composition for use in the present process, if obtained as a solid, may be reduced to powder form by any means known to those skilled in the art. The lipid used herein, whether liquid or solid, is in one embodiment, suspended, dispersed, or dissolved into an aqueous solution (such as water, an aqueous solution of dilute acid, an aqueous solution of dilute base or an aqueous solution of salt, or a combination thereof) to form the lipid composition employed herein as the iron-extracting composition. Some or all of the lipids may be suspended, dispersed, or dissolved into an aqueous solution containing a percentage of organic solvent, as long as the content of organic solvent does not prevent attachment of the lipid to the iron species or iron-containing particles. Suspension, dispersion or dissolution of the lipid in a liquid may be achieved by mechanical agitation, mechanical stirring or sonication, or any other method that does not cause partial or total degradation of the lipid.

The practice of the invention is illustrated by the following non-limiting examples.

Example 1

Treatment of Crude Hydrocarbon Oil with Hydrofracking Water/Lipid Emulsion 7.5 g of a commercially available powder preparation of hydrogenated phospholipids from soybean, containing 70% phosphatidylcholine (PHOSPHOLIPON®80H, Lipoid GmbH, Ludwigshafen, Germany) (a two-tailed lipid), was added to 240 ml of hydrofracking water obtained from a fracking site in Kenedy County, Tex. The resulting emulsion was kept at room temperature (25° C.) and then added to 3.78 L (1 gallon) of crude oil with mixing for about 3 minutes until the lipid the formation of a homogenous mixture with the crude oil. Upon standing the hydrocarbon oil separated into an iron-enriched lipid-layer and a hydrocarbon layer. The iron content was determined in the latter by using the analytical technique inductively coupled plasma mass spectrometry (ICP-MS).

The experiment was conducted in triplicate. The results of the three trials are shown in Table 1. The percent reduction of iron level in the hydrocarbon ranged from 40% to 93% over the three trials.

TABLE 1

| | Trial | Fe concentration in sample (ppm)* |
|---|---|---|
| 1 | Pure untreated Crude Oil | 350 |
| | After addition of lipid | 210 |
| | % decrease in Fe | 40 |
| 2 | Pure untreated Crude Oil | 650 |
| | After addition of lipid | 45 |
| | % decrease in Fe | 93 |
| 3 | Pure untreated Crude Oil | 650 |
| | After addition of lipid | 430 |
| | % decrease in Fe | 44 |

*ppm = part per million

Example 2

Treatment of Hydrocarbon Oil with Lipid/Brine Emulsion

The procedure of Example 1 was followed except that brine was substituted for hydrofracking water in generating the lipid emulsion. The brine was prepared by adding salt to fresh water. The results are shown in Table 2. The percent reduction of iron level in the hydrocarbon oil ranged from 40% to 76%.

TABLE 2

| Trial | | Fe concentration in sample (ppm)* |
|---|---|---|
| 1 | Pure untreated Crude Oil | 7000 |
| | After addition of lipid | 250 |
| | % decrease in Fe | 40 |
| 2 | Pure untreated Crude Oil | 700 |
| | After addition of lipid | 170 |
| | % decrease in Fe | 76 |
| 3 | Pure untreated Crude Oil | 700 |
| | After addition of lipid | 370 |
| | % decrease in Fe | 47 |

*ppm = part per million

Example 3

Treatment of Hydrocarbon Oil with Lipid/Brine Emulsion

The procedure of Example 2 was followed except that a lipid composition similar to PHOSPHOLIPON®80H, comprising hydrogenated phospholipids from soybean, containing the two-tailed lipid phosphatidylcholine, was substituted for the same amount of PHOSPHOLIPON®80H hydrogenated lipids in preparing the lipid/brine emulsion. The results are shown in Table 3. The percent reduction of iron level in the hydrocarbon oil ranged from 69% to 84%.

TABLE 3

| Trial | | Fe concentration in sample (ppm)* |
|---|---|---|
| 1 | Pure untreated Crude Oil | 7000 |
| | After addition of lipid | 110 |
| | % decrease in Fe | 84 |
| 2 | Pure untreated Crude Oil | 700 |
| | After addition of lipid | 110 |
| | % decrease in Fe | 84 |
| 3 | Pure untreated Crude Oil | 700 |
| | After addition of lipid | 220 |
| | % decrease in Fe | 69 |

*= part per million

Example 4

Treatment of Flowback Water with Lipid Emulsion

Flowback water was obtained from Karnes County, Tex. and analyzed by X-ray fluorescence (XRF) to determine elemental composition. The primary elements, upon analysis, were iron, calcium, strontium, sulfur, potassium, and chlorine. Fifteen ml of the backflow water was treated with 0.125 grams of hydrogenated phospholipids from soybean containing 70% phosphatidylcholine (PHOSPHOLIPON®80H). The lipid powder was added directly to the backflow water. A control sample of backflow water remained untreated. The sample containing the lipid exhibited two visually apparent regions. The top region exhibited a color that was lighter than the untreated backflow water. The bottom region of the lipid-containing sample upon analysis was composed largely of the phospholipid. XRF showed high levels of phosphorous in this region due to the phospholipid molecules. The bottom region also displayed elevated levels of calcium and iron. The complete XRF analysis of the two samples is shown in Table 4. The concentration of iron in the liquid above the lipid layer in the test sample was 575 ppm, compared to 3401 ppm in the flowback water before treatment, constituting an 84% reduction in iron content.

TABLE 4

| | Fe | Ca | Rb | Mo | Bi | Sr | K | Al | Si | Cl | S |
|---|---|---|---|---|---|---|---|---|---|---|---|
| Untreated Back-Flow Water (ppm) | 3401 | 23763 | 9 | 33 | 28 | 174 | 592 | 23216 | 67772 | 159689 | 668 |
| Lipid Treated Back-flow water (liquid above lipid layer) (ppm) | 575 | 21420 | 8 | 17 | 24 | 159 | 564 | 21000 | 47330 | 135609 | 746 | ppm = parts per million;
Mo = Molybdenum;
Sr = Strontium
Rb = Rubidium;
Fe = Iron;
Bi = Bismuth;
Ca = Calcium;
K = Potassium;
Al = Aluminum;
Si = Silicon;
Cl = Chlorine;
S = Sulfur All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

We claim:

1. A method for reducing the level of iron in a source liquid comprising hydrocarbon oil, produced water or flowback water, the method comprising:
   adding into the source liquid a lipid composition comprising a two-tail lipid compound, said two-tail lipid compound comprising a hydrophilic head group attached to two of the same or different hydrophobic tails, in an amount effective to cause a separation of said source liquid into a first phase comprising the source liquid depleted in iron and a second phase comprising lipid and iron bound to the lipid; and recovering the first phase comprising the source liquid depleted in iron.

2. The method according to claim 1, wherein the source liquid comprises a hydrocarbon oil.

3. The method according to claim 2, wherein the hydrocarbon oil comprises crude oil.

4. The method according to claim 1, wherein the source liquid comprises produced water.

5. The method according to claim 1, wherein the source liquid comprises flowback water.

6. The method according to claim 1, wherein the iron contained in the source liquid is in the form of particles, and the second phase comprises lipid-bound iron particles.

7. The method according to claim 6 wherein the particles comprise particles of iron oxide or iron sulfide.

8. The method according to claim 1, wherein the iron contained in the source liquid is in the form of dissolved iron, and the second phase comprises lipid-iron complexes.

9. The method according to claim 1 herein the lipid composition comprises lipid dispersed in an aqueous medium.

10. The method of claim 1 wherein the two hydrophobic tails of the lipid compound are attached to the hydrophilic head group of the lipid compound by an ether or ester bond.

11. The method of claim 1 wherein the two hydrophobic tails of the lipid compound comprise hydrocarbon chains having from about 10 to about 24 carbon atoms.

12. The method of claim 1 wherein the lipid compound is selected from the group consisting of phospholipids, sphingolipids, glycolipids and combinations thereof.

13. The method of claim 12 wherein the phospholipids are selected from the group consisting of phosphatidylcholine, phosphatidylethanolamine, phosphatidic acid, phosphatidylinositol, and sphingomyelin.

14. A composition of a hydrocarbon oil comprising a first phase comprising said hydrocarbon oil, and second phase comprising iron bound to a two-tail lipid compound comprising a hydrophilic head group attached to two of the same or different hydrophobic tails, wherein the iron is in the form of dissolved iron, and the second phase comprises lipid iron complexes.

15. The composition according to claim 14, wherein the hydrocarbon oil is crude oil.

16. The composition according to claim 14 wherein the iron is additionally in the form of iron particles.

17. The composition according to claim 16, wherein the iron particles comprise particles of iron oxide or iron sulfide.

18. The composition of claim 14 wherein the two hydrophobic tails of the lipid compound are attached to the hydrophilic head group of the lipid compound by an ether or ester bond.

19. The composition of claim 14 wherein the two hydrophobic tails of the lipid compound comprise hydrocarbon chains having from about 10 to about 24 carbon atoms.

20. The composition of claim 14 wherein the lipid compound is selected from the group consisting of phospholipids, sphingolipids, glycolipids and combinations thereof.

21. The composition of claim 20 wherein the phospholipids are selected from the group consisting of phosphatidylcholine, phosphatidylethanolamine, phosphatidic acid, phosphatidylinositol, and sphingomyelin.

22. A composition of produced water or flowback water comprising a first phase comprising said produced water or flowback water and a second phase comprising iron bound to a two-tail lipid compound comprising a hydrophilic head group attached to two of the same or different hydrophobic tails, wherein the iron is in the form of dissolved iron, and the second phase comprises lipid-iron complexes.

23. The composition according to claim 22 wherein the iron is additionally in the form of iron particles.

24. The composition according to claim 23, wherein the iron particles comprise particles of iron oxide or iron sulfide.

25. The composition of claim 22 wherein the two hydrophobic tails of the lipid compound are attached to the hydrophilic head group of the lipid compound by an ether or ester bond.

26. The composition of claim 22 wherein the two hydrophobic tails of the lipid compound comprise hydrocarbon chains having from about 10 to about 24 carbon atoms.

27. The composition of claim 22 wherein the lipid compound is selected from the group consisting of phospholipids, sphingolipids, glycolipids and combinations thereof.

28. The composition of claim 27 wherein the phospholipids are selected from the group consisting of phosphatidylcholine, phosphatidylethanolamine, phosphatidic acid, phosphatidylinositol, and sphingomyelin.

* * * * *